United States Patent [19]

Johnson et al.

[11] Patent Number: 4,530,719
[45] Date of Patent: Jul. 23, 1985

[54] AUSTENITIC STAINLESS STEEL FOR HIGH TEMPERATURE APPLICATIONS

[75] Inventors: Gerald D. Johnson, Kennewick; Roger W. Powell, Pasco, both of Wash.

[73] Assignee: Westinghouse Electric Corp., Pittsburgh, Pa.

[21] Appl. No.: 484,322

[22] Filed: Apr. 12, 1983

[51] Int. Cl.$^3$ .............................................. C22C 38/40
[52] U.S. Cl. ......................................... 75/124; 75/125; 75/128 A; 75/128 F; 75/128 P; 75/128 G; 75/128 T; 376/900; 148/12 E; 148/12 B
[58] Field of Search ................ 75/124 C, 125, 128 A, 75/128 F, 128 G, 128 Z, 128 T, 128 P; 148/38, 12 R, 12 B, 12 E; 376/900; 138/177

[56] References Cited

U.S. PATENT DOCUMENTS

| | | | |
|---|---|---|---|
| 4,158,606 | 6/1979 | Bloom et al. | 75/128 T |
| 4,234,385 | 11/1980 | Ozaki et al. | 75/128 T |
| 4,407,673 | 10/1983 | Korenko | 75/128 A |
| 4,421,572 | 12/1983 | Bates et al. | 148/12 E |

OTHER PUBLICATIONS

Y. Kondo et al., The Effects of Metallurgical Variables on Creep of Type 316 Stainless Steel, Radiation Effects in Breeder Reactor Structural Materials, Proceeding Confer., Jun. 19-23, 1977, Arizona, Met. Society of AIME, pp. 253-267.

M. Terasawa et al., The Influence of Metallurgical Variables on Void Swelling in Type 316 Steel. Ibid, pp. 687-707.

*Primary Examiner*—L. Dewayne Rutledge
*Assistant Examiner*—Debbie Yee
*Attorney, Agent, or Firm*—John J. Prizzi

[57] ABSTRACT

This invention describes a composition for an austenitic stainless steel which has been found to exhibit improved high temperature stress rupture properties. The composition of this alloy is about (in wt. %): 12.5 to 14.5 Cr; 14.5 to 16.5 Ni; 1.5 to 2.5 Mo; 1.5 to 2.5 Mn; 0.1 to 0.4 Ti; 0.02 to 0.08 C; 0.5 to 1.0 Si; 0.01 maximum, N; 0.02 to 0.08 P; 0.002 to 0.008 B; 0.004–0.010 S; 0.02–0.05 Nb; 0.01–0.05 V; 0.005–0.02 Ta; 0.02–0.05 Al; 0.01–0.04 Cu; 0.02–0.05 Co; 0.03 maximum, As; 0.01 maximum, O; 0.01 maximum, Zr; and with the balance of the alloy being essentially iron. The carbon content of the alloy is adjusted such that wt. % Ti/(wt. % C+wt. % N) is between 4 and 6, and most preferably about 5. In addition the sum of the wt. % P+wt. % B+wt. % S is at least 0.03 wt. %. This alloy is believed to be particularly well suited for use as fast breeder reactor fuel element cladding.

10 Claims, 4 Drawing Figures

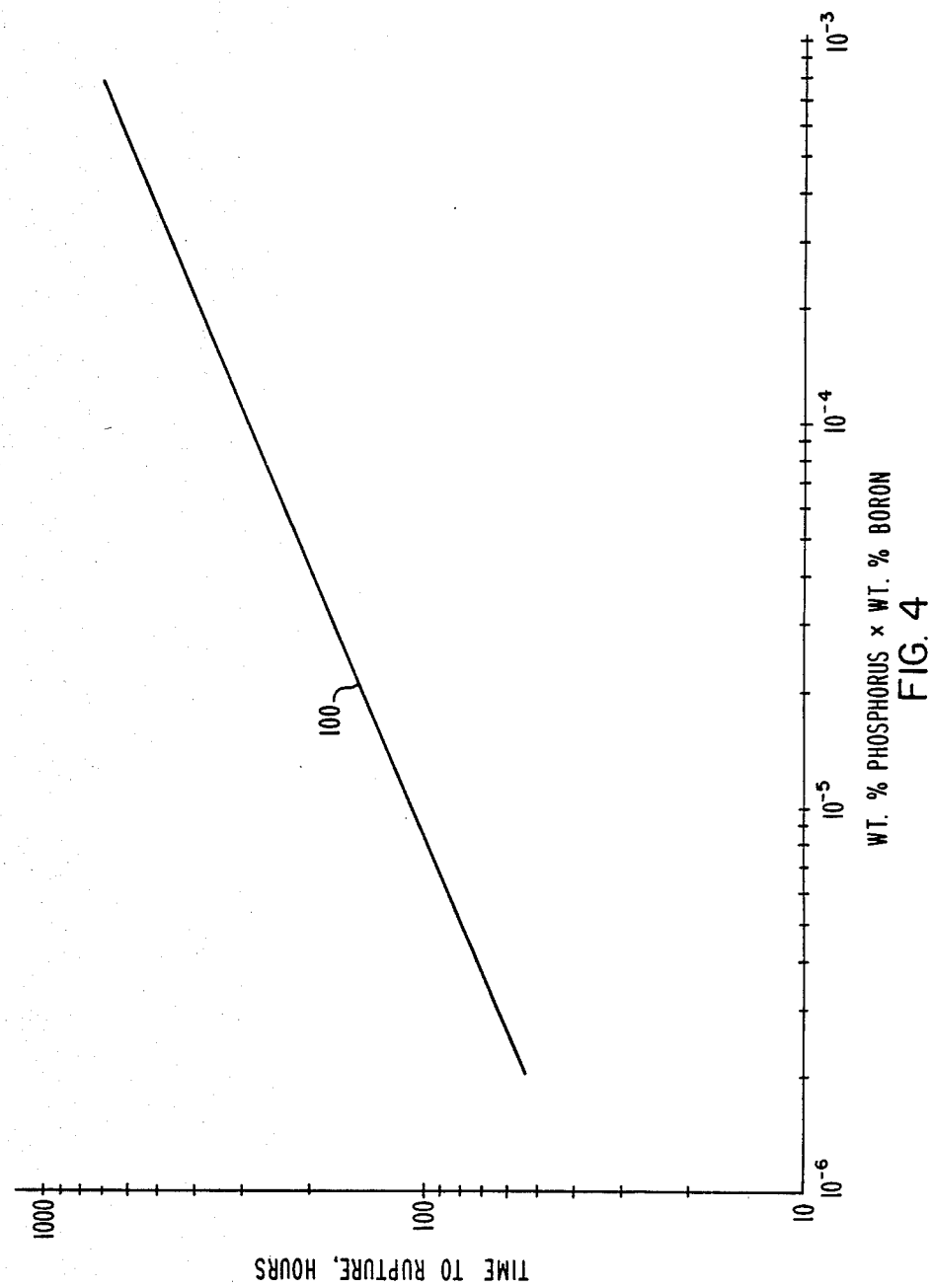

AUSTENITIC STAINLESS STEEL FOR HIGH TEMPERATURE APPLICATIONS

GOVERNMENT CONTRACT

The invention described herein was made during the course of or in the performance of work under U.S. Government Contract No. DE-AC06-76FF02170 under the auspices of the Department of Energy.

CROSS-REFERENCE TO RELATED APPLICATIONS

John F. Bates et al., copending application Ser. No. 414,167 filed on Sept. 2, 1982, entitled "Austenitic Alloy and Reactor Components Made Thereof" pertains to austenitic stainless steels containing increased levels of phosphorus to provide enhanced inreactor swelling resistance. The specification of this application is hereby incorporated by reference.

The present invention relates to austenitic stainless steels for use in high temperature applications. More particularly, the present invention especially relates to austenitic stainless steel alloys for use in nuclear reactor applications.

One of the prime objectives in the efforts to develop a commercially viable liquid metal fast breeder reactor (LMFBR) has been to develop an alloy, or alloys, which are swelling resistant and have the required in-reactor mechanical properties for use as fuel cladding and/or use as ducts. The fuel cladding will see service in contact with flowing liquid sodium and have a surface temperature of about 400° C. (~750° F.) to 650° C. (~1200° F.). A duct surrounds each bundle of fuel pins and sees service at about 380° C. (~715° F.) to 550° C. (~1020° F.). These components will be exposed at the aforementioned elevated temperatures to fast neutron fluxes on the order of $10^{15}$ n/cm$^2$·S (E>0.1 MeV), and should be capable of performing adequately to fluences on the order of 2 to $3 \times 10^{23}$ n/cm$^2$ (E>0.1 MeV).

Initially, one of the prime candidate alloys for commercial LMFBR, fuel cladding and ducts was 20% cold worked AISI 316 steel, a solid solution strengthened austenitic stainless steel (see Bennett and Horton, "Material Requirements for Liquid Metal Fast Breeder Reactor," *Metallurgical Transactions* A, Vol. 9A, February 1978, pp. 143-149). Typical chemistry and material fabrication steps for nuclear grade 316 fuel cladding are described in U.S. Pat. No. 4,421,572 filed on Mar. 18, 1982. The specification of U.S. Pat. No. 4,421,572 is hereby incorporated by reference.

Current commercial composition specifications for nuclear grade 316 stainless steel contain only a maximum value for impurities such as phosphorus, sulphur, boron, aluminum, niobium, vanadium, tantalum, copper and cobalt. Typical commercial melting procedure for this alloy involves double-vacuum melting of electrolytic-grade starting materials. This practice results in low levels of the aforementioned impurities, which depending on the particular impurity, may be 10 to 100 times less than the maximum value allowed by the specification.

However, the 316 alloy undergoes a high degree of void swelling during extended exposure to fast neutron fluxes at the LMFBR operating temperatures. Extensive development efforts aimed at reducing swelling have been undertaken, and are exemplified by U.S. Pat. No. 4,158,606 and U.S. Pat. No. 4,407,673 filed on Jan. 9, 1980.

While the aforementioned efforts have led to improvements in swelling resistance, the stress rupture behavior of these alloys in fuel pin cladding applications remains as one of the major limitations on fuel pin life and improvements in this area are needed for long-life LMFBR cores.

Applicants have now discovered that in the solid solution strengthened austenitic stainless steels that stress rupture strength increases as the sum of the phosphorus, sulphur and boron contents of the alloy increase. Based on this discovery, applicants have developed alloy compositions having enhanced stress rupture properties and good swelling resistance, making them suitable for use as fuel pin cladding. These alloy compositions are summarized in Table I and utilize phosphorus, boron and sulphur, in conjunction with controlled quantities of selected impurities and a controlled ratio of wt.% titanium to the sum of the wt.% carbon and nitrogen, to provide the desired stress rupture properties.

TABLE I

| | Alloy Compositions in Wt. %* | | |
|---|---|---|---|
| Element | Broad Range | Preferred Range | Preferred Nominal Composition |
| C | .02–.08 | .02–.08 | .05 |
| Mn | 1.5–2.5 | 1.65–2.35 | 2.0 |
| Si | .5–1.0 | .7–.9 | .8 |
| P | .02–.08 | .025–.06 | .03 |
| S | .004–.010 | .005–.010 | .005 |
| Cr | 12.5–14.5 | 12.5–14.5 | 13.5 |
| Ni | 14.5–16.5 | 14.5–16.5 | 15.5 |
| Mo | 1.5–2.5 | 1.7–1.9 | 1.8 |
| Al | .02–.05 | .02–.04 | .03 |
| B | .002–.008 | .003–.006 | .006 |
| Ti | .1–.4 | .1–.4 | .25 |
| Zr | ≦.01 | ≦.01 | ≦.01 |
| Nb | .02–.05 | .02–.04 | .03 |
| V | .01–.05 | .01–.04 | .02 |
| Ta | .005–0.02 | .005–.02 | .01 |
| Cu | .01–0.04 | .01–.03 | .02 |
| N | ≦.01 | ≦.005 | ≦.005 |
| O | ≦.01 | ≦.01 | ≦.01 |
| Co | .02–.05 | .02–.04 | .03 |
| As | ≦.03 | ≦.03 | ≦.03 |
| ΣP + S + B | ≧.03 | ≧.035 | .04 |
| Ti/(C + N) | 4–6 | 4–6 | 5 |

*Except for impurities, iron makes up the balance of the alloy compositions.

In accordance with the present invention, it is preferred that within the broad range shown in Table I that the sulphur content be limited to 0.005 to 0.010 wt.%, the phosphorus content be limited to 0.025 to 0.06 wt.%, and the boron content be limited to 0.003 to 0.006 wt.%.

It is also preferred that the Ti/C+N for both the broad and preferred compositions shown in Table I be between 4.5 and 5.5.

While the alloys according to the present invention may be put to good use in any high temperature applications requiring good stress rupture properties in the temperature range of about 500° to 800° C., the present alloys are particularly well suited for use in elevated temperature, high fluence, fast neutron irradiation environments such as those encountered by fuel element cladding in an LMFBR core. In this application, the alloy requires a cold worked microstructure which may be produced by the final cold working step in tube fabrication. A 10 to 40%, and more preferably, a 15 to 25% final reduction in area is desired in the final cold working step.

These and other aspects of the present invention will become more apparent upon a reading of the following detailed specification in conjunction with the figures listed immediately below.

BRIEF DESCRIPTION OF THE DRAWINGS

FIG. 4 shows stress rupture life at 700° C. under an applied stress of 36.6 ksi as function the (wt.% P)×(wt.% B).

DETAILED DESCRIPTION OF THE INVENTION

Figure 1:
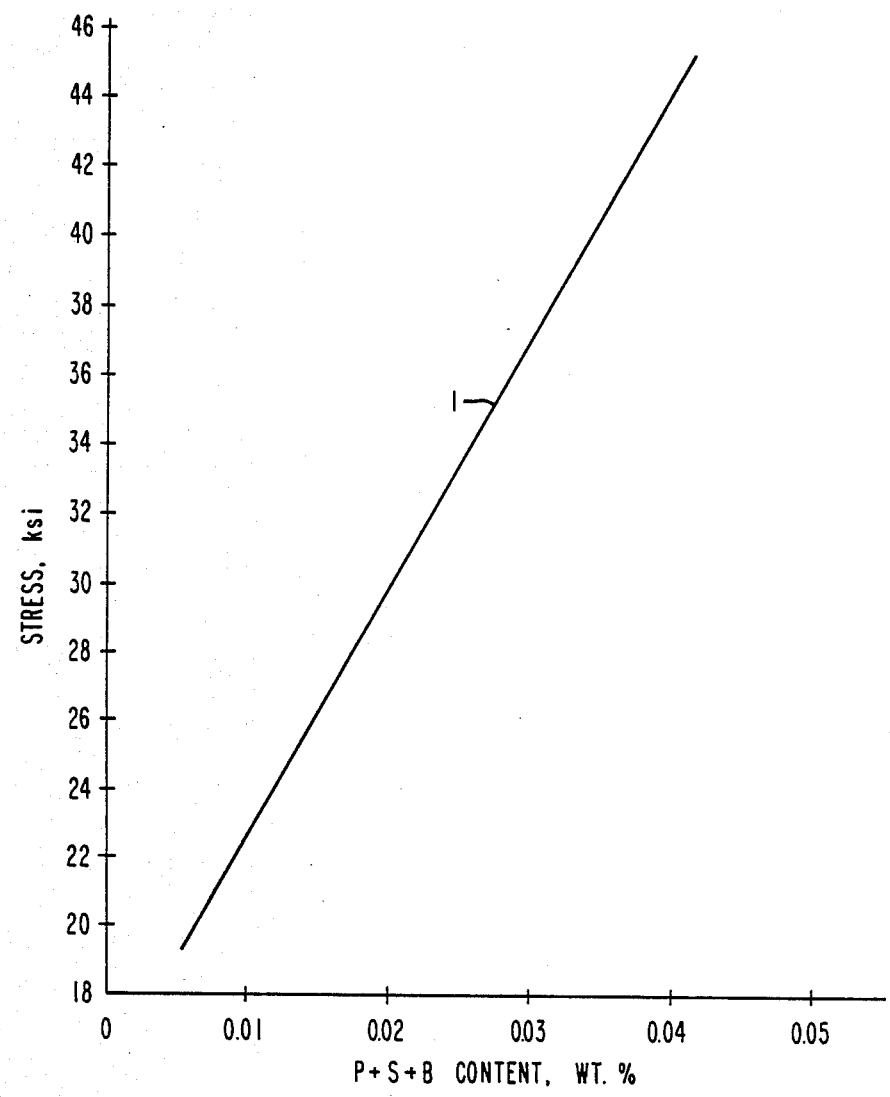
FIG. 1 shows a graph of the stress required to produce rupture in 1000 hours at 650° C. as a function of the sum of the phosphorus, boron and sulphur contents in weight percent.

As demonstrated in FIG. 1, applicants have discovered that stress rupture strength in austenitic stainless steels is a function of the sum of the phosphorus, sulfur and boron contents of the alloy. More particularly, curve 1 shows that the stress required to produce rupture in these alloys in 1000 hours at 650° C. increases substantially linearly with increasing phosphorus, sulphur and boron content.

Based on the relationship between rupture strength and the aforementioned elements disclosed by FIG. 1, it is required that the alloys of the present invention have at least 0.03 wt.%, and preferably at least 0.035 wt.%, total, of boron, phosphorus and sulphur. It is further believed that small, but finite amounts of the impurities niobium, vanadium, tantalum, aluminum, copper, and cobalt, should also be present to provide the desired stress rupture properties. To this end, applicants have set minimum values for each of these elements as shown by Table I.

In addition, in the alloys of the present invention, it is required that the ratio (on a weight percentage basis) of titanium to the sum of carbon and nitrogen be between 4 and 6 and most preferably about 5. It is believed that in the present alloys, the aforementioned Ti/(C+N) ratio range is conducive to placing a large fraction of the carbon and nitrogen atoms in the alloy into fine, Ti(C,N) particles dispersed through the cold worked austenitic matrix. In alloys having the specified Ti/(C+N) ratios, these fine Ti(C,N) particles are expected to be more resistant to coarsening during elevated temperature use and thereby maintain the inhibiting effect these particles have on dislocation motion for longer periods of elevated temperature use at a specific temperature.

In producing the alloys according to the present invention, the electrolytically pure starting materials of the prior art may be partially or entirely replaced by scrap which has been selected to provide a melt chemistry, meeting the requirements of Table I. Any of the melting techniques known in the art may be used in the production of the present alloys so long as they are capable of providing a product meeting the Table I chemistry requirements. Double-vacuum melting is specifically contemplated.

Standard hot working, cold working and annealing techniques used in the prior art may be utilized to fabricate final size components from ingots of the present alloys. Fuel element cladding may be fabricated from hot worked billets by cold working reductions having anneals between each reduction as is described in co-pending application Ser. No. 414,167 and U.S. Pat. No. 4,421,572. The finished cladding should have a cold worked microstructure produced by a final cold working reduction of about 10 to 40% in cross-sectional area, with reductions of 15 to 25% being preferred.

The invention will be further clarified by a consideration of the following examples, which are intended to be purely exemplary of the invention.

Nine heats having the compositions shown in Table II, with varying boron and phosphorus contents, were melted and fabricated down to round bar stock having a diameter of about 0.53 to 0.532 inches. Prior to the final cold working reduction, the alloys were annealed at about 1066° C. for about 15 minutes and then air-cooled. The final cold working reduction was about 23%.

Figure 3:
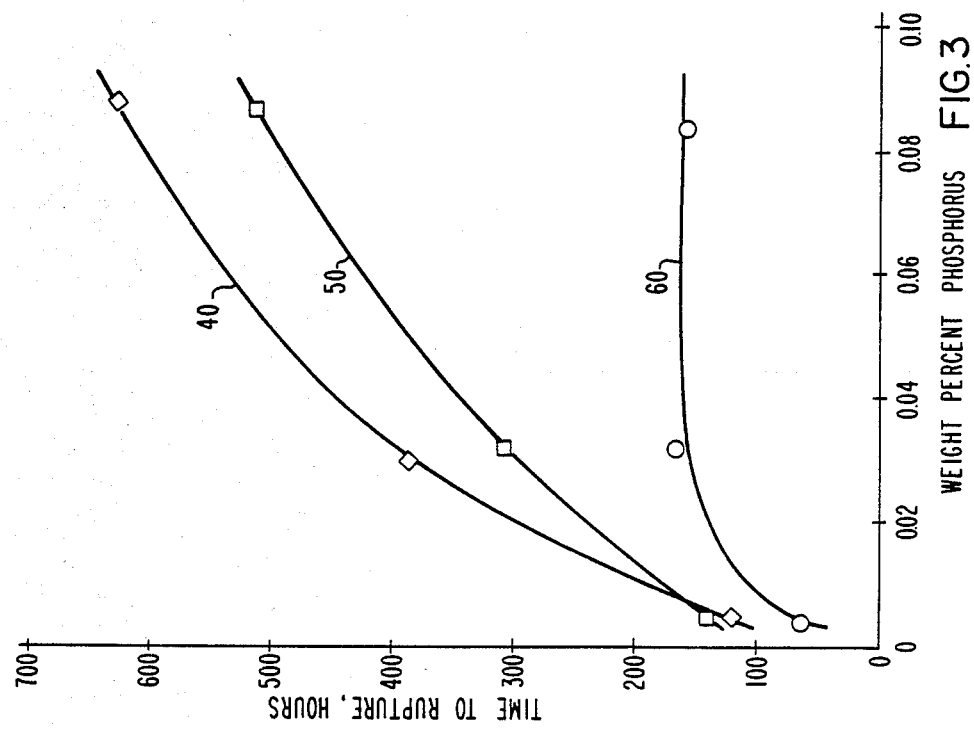
FIG. 3 shows the effect of varying phosphorus contents on stress rupture life at 700° C. for a stress of 36.6 ksi for three different boron contents.
Figure 2:
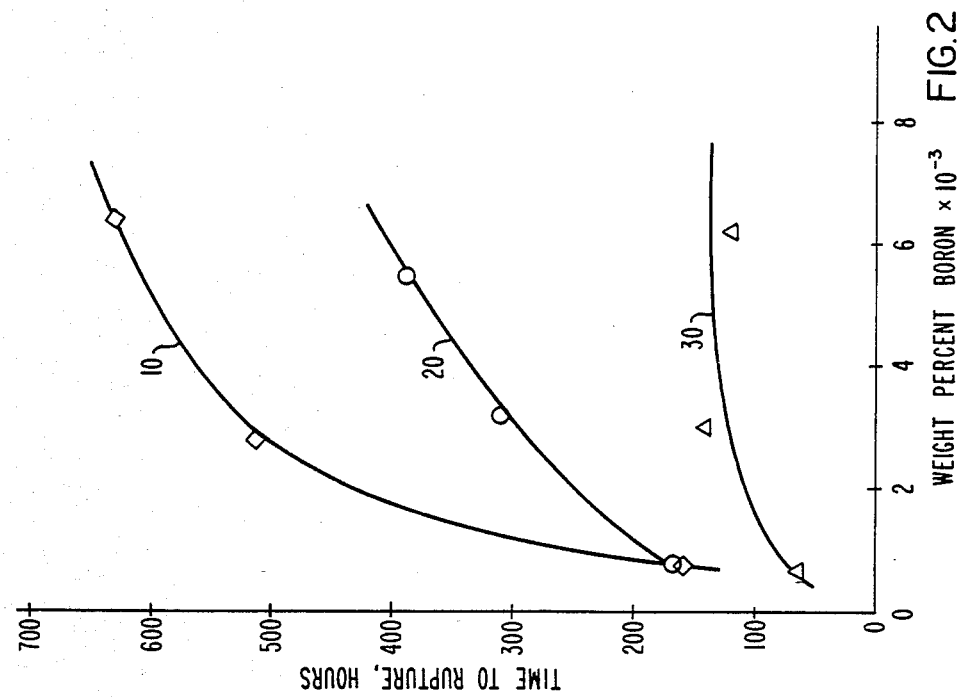
FIG. 2 shows the effect of varying boron contents on stress rupture life at 700° C. for a stress of 36.6 ksi for three different phosphorus contents.

Stress rupture testing of the final cold worked bars, highlighted an unexpected and surprising interaction between boron and phosphorus contents shown in FIGS. 2 through 4. These Figures indicate that stress rupture lifetime is dependent on a strong interaction between the boron and phosphorus contents in the alloys of the present invention.

FIG. 2 shows lifetime to rupture, at 700° C. and a stress of 36.6 ksi, as a function of boron content for three different levels of phosphorus content. Curve 30 shows that increasing boron content in alloys containing >0.005 wt.% phosphorus while initially producing a small increase in rupture lifetime, does not produce an increase in rupture lifetime above boron contents of 0.0028 wt.%. Curve 20, for alloys containing nominally 0.03 wt.% phosphorus, indicates that increasing the boron content of these alloys results in a substantially linear increase in the rupture life time. Curve 10 for alloys containing nominally 0.085 wt.% phosphorus, indicates that increasing the boron content from 0.0008 wt.% to 0.0029 wt.% results in an approximate tripling of the stress rupture life time. Increasing the boron content from 0.0029 to 0.0064 wt.% results in a further increase in rupture lifetime which is, however, not as large as the increase in going from 0.0008 to 0.0029 wt.%.

FIG. 3, utilizing the same data used to plot the FIG. 2 curves, shows the stress rupture lifetime as a function of phosphorus content for three different levels of boron content. Curve 60, for alloys containing nominally 0.0008 wt.% boron, shows that increasing phosphorus from less than 0.005 wt.% to about 0.03 wt.% produces a small increase in rupture lifetime, but that further increases in phosphorus content do not produce further increases in rupture lifetime. Curve 50, for alloys containing about 0.003 wt.% boron, shows that increasing phosphorus produces an almost linearly increasing stress rupture lifetime from just above 100 hours for less than 0.005 wt.% phosphorus to over 500 hours for about 0.085 wt.% phosphorus. Curve 40, for alloys containing about 0.006 wt.% boron, shows that up to about 0.03 wt.% phosphorus, rupture lifetime increases at a faster rate than in the 0.003 wt.% boron alloys 50, but beyond about 0.030 wt.% phosphorus, the rate of increase in rupture lifetime with phosphorus content is substantially the same as that shown by curve 50 for the same phosphorus content interval.

TABLE II

| | CHEMICAL ANALYSIS Wt. % | | | | | | | | |
|---|---|---|---|---|---|---|---|---|---|
| | HEAT NO. | | | | | | | | |
| Element | A | B | C | D | E | F | G | H | I |
| C | .047 | .046 | .048 | .048 | .049 | .048 | .048 | .044 | .046 |
| Mn | 2.21 | 2.26 | 2.28 | 1.64 | 2.27 | 2.20 | 2.19 | 2.20 | 2.24 |
| Si | .81 | .89 | .79 | .76 | .80 | .82 | .78 | .81 | .80 |
| P | .030 | .032 | .084 | <.005 | <.005 | .032 | .088 | .088 | <.005 |
| S | .004 | .005 | .004 | .003 | .005 | .004 | .004 | .006 | .005 |
| Cr | 13.57 | 13.60 | 13.65 | 13.59 | 13.53 | 13.66 | 13.59 | 13.63 | 13.55 |
| Ni | 15.48 | 15.55 | 15.66 | 15.69 | 15.61 | 15.60 | 15.59 | 15.60 | 15.60 |
| Mo | 1.80 | 1.82 | 1.81 | 1.74 | 1.81 | 1.81 | 1.82 | 1.81 | 1.81 |
| Cu | .02 | .02 | .02 | .02 | .01 | .02 | .02 | .02 | .01 |
| Co | .03 | .03 | .03 | .03 | .03 | .03 | .03 | .03 | .03 |
| V | .02 | .02 | .03 | .02 | .02 | .02 | .03 | .03 | .02 |
| Ti | .27 | .27 | .27 | .25 | .27 | .27 | .27 | .27 | .27 |
| Al | .03 | .04 | .03 | .03 | .03 | .03 | .03 | .03 | .03 |
| N | .003 | .005 | .003 | .002 | .003 | .002 | .005 | .006 | .004 |
| B | .0054 | .0008 | .0008 | .0028 | .0062 | .0033 | .0029 | .0064 | .0007 |
| Nb | .03 | .03 | .03 | .02 | .03 | .03 | .03 | .02 | .03 |
| TA | .011 | .008 | .010 | .009 | .007 | .010 | .008 | .008 | .009 |
| Zr | <.005 | <.005 | <.005 | <.005 | <.005 | <.005 | <.005 | <.005 | <.005 |
| As | <.005 | <.005 | <.005 | <.005 | <.005 | <.005 | <.005 | <.005 | <.005 |
| O | <.05 | <5 ppm | <5 ppm | <5 ppm | <5 ppm | <5 ppm | <5 ppm | <5 ppm | <5 ppm |
| P + S + B | .0394 | .0378 | .0888 | <.0108 | <.0162 | .0393 | .0949 | .1004 | <.0107 |
| Ti/(C + N) | 5.4 | 5.3 | 5.3 | 5.0 | 5.2 | 5.4 | 5.1 | 5.4 | 5.4 |

In FIG. 4, the base ten logarithm of rupture lifetime is plotted as a function of the base ten logarithm of the product of the wt.% phosphorus times the wt.% boron. Curve 100, based on the data used to generate FIGS. 2 and 3, shows that rupture lifetime is a function of the product of the phosphorus and boron content where:

$R_L \propto (wt.\% P \times wt.\% B)^n$ $R_L$ = rupture lifetime n = slope of curve 100, for T = 700° C. and $\sigma$ = 36.6 ksi Based on the data shown in FIGS. 2 through 4, it is apparent that: (1) at boron contents of about 0.001 wt.% or less, increasing the phosphorus content from <0.005 to about 0.085 wt.% will not produce any significant change in rupture lifetime; and (2) at phosphorus contents less than 0.02 wt.%, that increasing the boron content will not produce any significant change in rupture lifetime. The present inventors therefore believe that in the present alloys it is critical that there be at least 0.002 wt.% boron and 0.02 wt.% phosphorus present. The maximum boron and phosphorus contents should be maintained below about 0.008 wt.% and about 0.08 wt.%, respectively, to assure the fabricability and weldability of the alloys. To achieve an optimum combination of rupture, fabrication and welding properties, boron should be present at levels of 0.003 wt.% to 0.006 wt.%, and phosphorus should be present between 0.025 wt.% and 0.06 wt.%. Maximum stress rupture lifetime can be obtained by simultaneously maximizing the boron and phosphorus contents within the above ranges. Approximately equivalent stress rupture lifetimes can be maintained between different alloys having varying boron and phosphorus contents within the aforementioned ranges by setting the product of the phosphorus and boron contents of the desired alloy equal to the product of the phosphorus and boron contents of the other alloy.

Other embodiments of the invention will become more apparent to those skilled in the art from consideration of the specification or practice of the invention disclosed herein. It is intended that the specification and examples be considered as exemplary only, with the true scope and spirit of the invention being indicated by the following claims.

We claim:

1. An austenitic stainless steel alloy consisting essentially of:

0.02 to 0.08 wt.% carbon;
about 1.5 to about 2.5 wt.% manganese;
about 0.5 to about 1.0 wt.% silicon;
between 0.02 and 0.08 wt.% phosphorus;
0.004 to 0.010 wt.% sulphur;
about 12.5 to about 14.5 wt.% chromium;
about 14.5 to about 16.5 wt.% nickel;
about 1.5 to about 2.5 wt.% molybdenum;
0.02 to 0.05 wt.% aluminum;
0.002 to 0.008 wt.% boron;
0.1 to 0.4 wt.% titanium;
up to 0.01 wt.% zirconium;
0.02 to 0.05 wt.% niobium;
0.01 to 0.05 wt.% vanadium;
0.005 to 0.02 wt.% tantalum;
0.01 to 0.04 wt.% copper;
up to 0.01 wt.% nitrogen;
up to 0.01 wt.% oxygen;
0.02 to 0.05 wt.% cobalt;
up to 0.03 wt.% arsenic;
the balance being essentially iron with impurities;
and wherein the sum of the wt.% phosphorus plus the wt.% sulphur plus the wt.% boron is greater than 0.03 wt.%;
and wherein the ratio of the wt.% Ti to the sum of the wt.% carbon plus the wt.% nitrogen is between 4 and 6.

2. An austenitic stainless steel alloy consisting essentially of:

0.02 to 0.08 wt.% carbon;
about 1.65 to about 2.35 wt.% manganese;
about 0.7 to about 0.9 wt.% silicon;
between 0.025 and 0.06 wt.% phosphorus;
0.005 to 0.010 wt.% sulphur;
about 12.5 to about 14.5 wt.% chromium;
about 14.5 to about 16.5 wt.% nickel;
about 1.7 to about 1.9 wt.% molybdenum;

0.02 to 0.04 wt.% aluminum;
0.003 to 0.006 wt.% boron;
0.0.1 to 0.4 wt.% titanium;
up to 0.01 wt.% zirconium;
0.02 to 0.04 wt.% niobium;
0.01 to 0.04 wt.% vanadium;
0.005 to 0.02 wt.% tantalum;
0.01 to 0.03 wt.% copper;
up to 0.005 wt.% nitrogen;
up to 0.01 wt.% oxygen;
0.02 to 0.04 wt.% cobalt;
up to 0.03 wt.% arsenic;
and wherein the ratio of the wt.% Ti to the sum of the wt.% carbon plus the wt.% nitrogen is between 4 and 6.

3. A fuel element cladding tube for use in an elevated temperature, high fluence, fast neutron irradiation environment, said tube comprising an alloy containing:
0.02 to 0.08 wt.% carbon;
about 1.5 to about 2.5 wt.% manganese;
about 0.5 to about 1.0 wt.% silicon;
between 0.02 and 0.08 wt.% phosphorus;
0.005 to 0.010 wt.% sulphur;
about 12.5 to about 14.5 wt.% chromium;
about 14.5 to about 16.5 wt.% nickel;
about 1.5 to about 2.5 wt.% molybdenum;
0.02 to 0.05 wt.% aluminum;
0.002 to 0.008 wt.% boron;
0.1 to 0.4 wt.% titanium;
up to 0.01 wt.% zirconium;
0.02 to 0.05 wt.% niobium;
0.01 to 0.05 wt.% vanadium;
0.005 to 0.02 wt.% tantalum;
0.01 to 0.04 wt.% copper;
up to 0.01 wt.% nitrogen;
up to 0.01 wt.% oxygen;
0.02 to 0.05 wt.% cobalt;
up to 0.03 wt.% arsenic;
the balance being essentially iron with impurities;
wherein the sum of the wt.% phosphorus plus the wt.% sulphus plus the wt.% boron is greater than 0.03 wt.%;
and wherein the ratio of the wt.% titanium to the sum of the wt.% carbon plus wt.% nitrogen is between 4 and 6.

4. The cladding tube according to claim 3 wherein said alloy has a cold worked microstructure.

5. The alloy according to claim 1 wherein carbon is present at a level of about 0.04 to about 0.05 wt.%.

6. The alloy according to claim 2 wherein carbon is present at a level of about 0.04 to about 0.05 wt.%.

7. The alloy according to claim 1 wherein the ratio of the wt.% titanium to the sum of the wt.% carbon plus wt.% nitrogen is between 4.5 and 5.5.

8. The alloy according to claim 1 wherein the sum of the wt.% phosphorus, plus the wt.% sulphur, plus the wt.% boron is greater than 0.035 wt.%.

9. A process for making fuel element cladding for use in an elevated temperature, high fluence fast neutron irradiation environment comprising the steps of:
selecting an alloy consisting essentially of
0.02 to 0.08 wt.% carbon,
about 1.5 to about 2.5 wt.% manganese,
about 0.5 to about 1.0 wt.% silicon,
between 0.02 and 0.08 wt.% phosphorus,
0.005 to 0.010 wt.% sulphur,
about 12.5 to about 14.5 wt.% chromium,
about 14.5 to about 16.5 wt.% nickel,
about 1.5 to about 2.5 wt.% molybdenum,
0.02 to 0.05 wt.% aluminum,
0.002 to 0.008 wt.% boron,
0.1 to 0.4 wt.% titanium,
up to 0.01 wt.% zirconium,
0.01 to 0.05 wt.% vanadium,
0.02 to 0.05 wt.% niobium,
0.005 to 0.02 wt.% tantalum,
0.01 to 0.04 wt.% copper,
up to 0.01 wt.% nitrogen,
up to 0.01 wt.% oxygen,
0.02 to 0.05 wt.% cobalt,
up to 0.03 wt.% arsenic,
the balance being essentially iron with impurities,
wherein the sum of the wt.% phosphorus plus the wt.% sulphur plus the wt.% boron is greater than 0.03 wt.%,
and wherein the ratio of the wt.% titanium to the sum of the wt.% carbon plus the wt.% nitrogen is between 4 and 6;
fabricating said alloy into tubing;
wherein said fabricating includes cold working steps having intermediate anneals between each cold working step;
and a final reducing step comprising a cold working reduction of about 10 to 40 percent reduction in area.

10. The process according to claim 9 wherein said final reducing step is a 15 to 25 percent cold reduction in area.

* * * * *